United States Patent [19]

Nagai et al.

[11] Patent Number: 4,797,870
[45] Date of Patent: Jan. 10, 1989

[54] OPTICAL RECORDING AND REPRODUCING APPARATUS

[75] Inventors: Tadao Nagai, Sagamiko; Kenichi Sato, Tokyo, both of Japan

[73] Assignee: TEAC Corporation, Tokyo, Japan

[21] Appl. No.: 93,380

[22] Filed: Sep. 4, 1987

[30] Foreign Application Priority Data

Sep. 20, 1986 [JP] Japan ................................ 61-222982

[51] Int. Cl.$^4$ ............................................... G11B 7/00
[52] U.S. Cl. ....................................... 369/100; 369/44; 369/112; 369/121; 358/342
[58] Field of Search ........................... 369/44–46, 369/109, 110, 116, 112, 121; 358/342

*Primary Examiner*—William L. Sikes
*Assistant Examiner*—Akm E. Ullah
*Attorney, Agent, or Firm*—Ladas & Parry

[57] ABSTRACT

An optical recording and reproducing apparatus comprises an optical disc having a recording surface; a laser diode emitting a laser beam; an optical lens for changing the laser beam into a parallel laser beam; a diffraction grating for diffracting the parallel laser beam and generating 0-order and ±1st diffracted lights, a light intensity ratio of each of the ±1st diffracted lights to the 0-order diffracted light ranging from 8:1 to 9:1; and an optical system for forming spot lights of the 0-order and ±1st diffracted lights on the recording surface of the disc and extracting the 0-order and ±1st diffracted lights which have been reflected from on the recording surface.

4 Claims, 3 Drawing Sheets

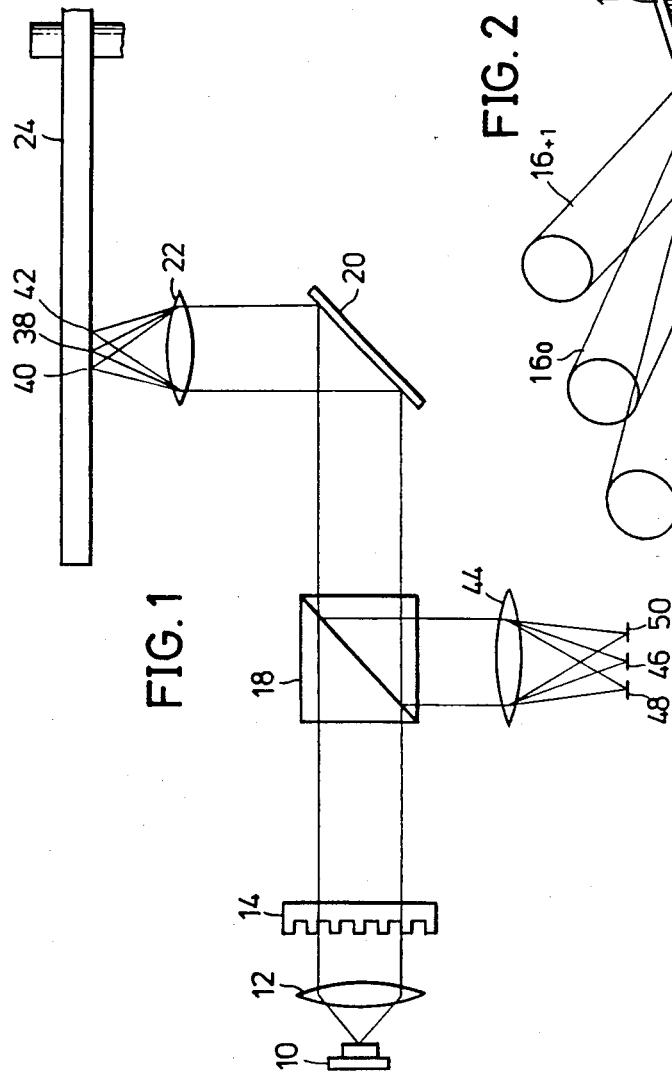
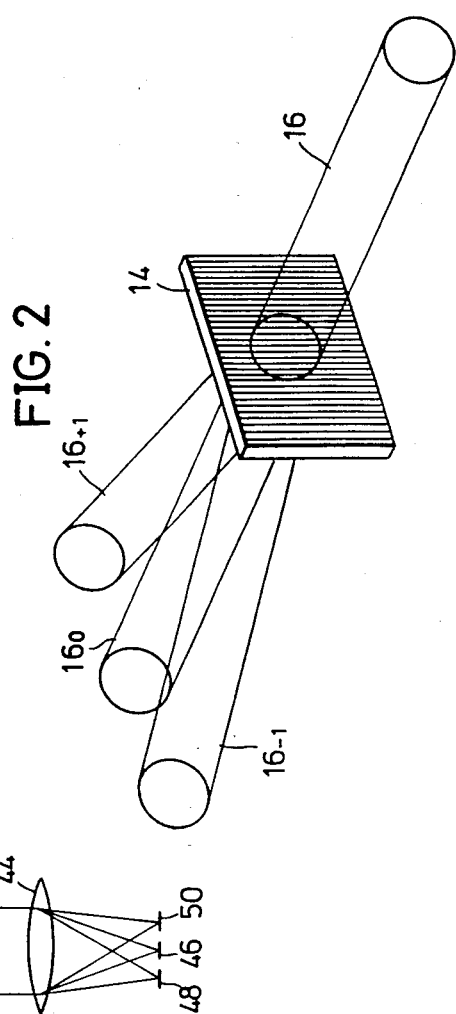

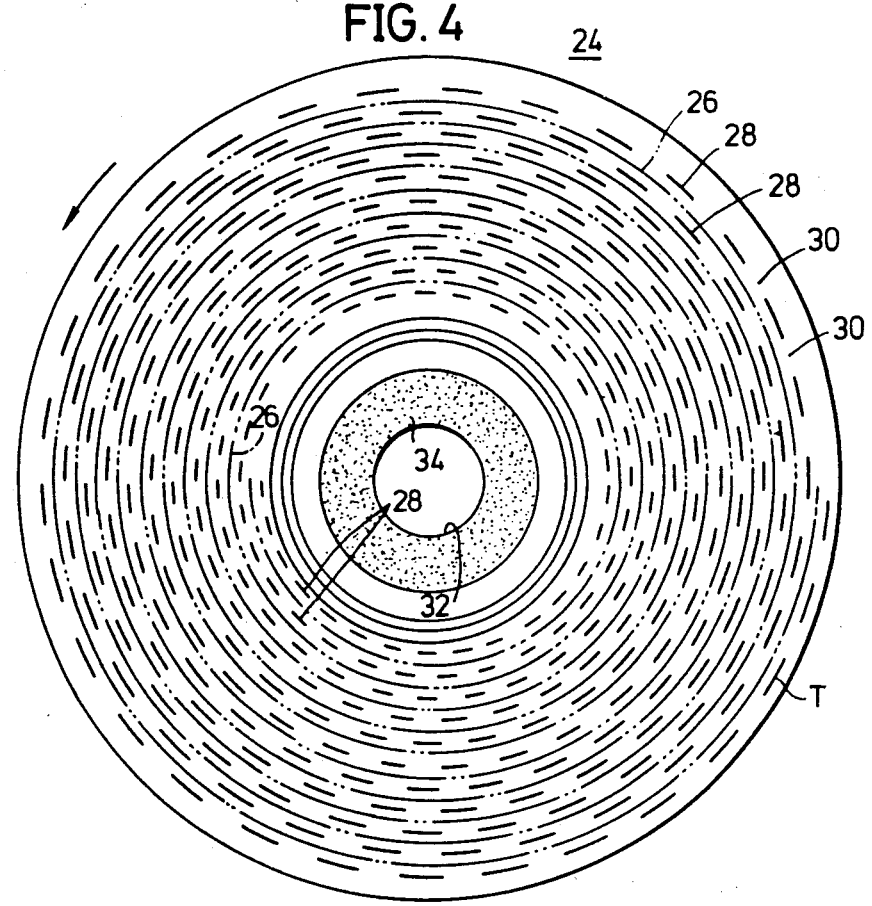

OPTICAL RECORDING AND REPRODUCING APPARATUS

BACKGROUND OF THE INVENTION

The present invention generally relates to optical recording and reproducing apparatuses, and more particularly to optical recording and reproducing apparatuses for recording and reproducing an information signal on and from a rotary recording medium having a guide track which is used for guiding a light beam when recording and reproducing the information signal, by accurately controlling the tracking of the light beam.

Conventionally, when recording an information signal on a rotary recording medium (hereafter simply referred to as a disc) by a light beam, a guide track is first formed on an unrecorded disc and record the information signal is recorded on the disc by guiding the light beam by use of the guide track. The guide track may be constituted by a pair of continuous spiral tracks having a predetermined depth and located on both sides of a main track on and from which the information is recorded and reproduced. The above scheme is disclosed in a Japanese Laid-Open Patent Application No. 49-113601, for example.

When recording or reproducing the information signal on or from the disc which is formed with the pair of continuous spiral guide tracks, a pair of sub light beams for tracking are used in addition to a main light beam for recording or reproducing the information signal. The sub light beams are irradiated on the disc at positions which respectively lead and trail a position irradiated by the main light beam in the scanning direction and are mutually deviated in the width direction of the main track. A tracking control is performed so that one of the sub light beams is irradiated on a portion of one of the guide tracks and the other sub light beam is irradiated on a portion of the other guide track. Accordingly, tracking of the main track is controlled to accurately scan the main track in order to record and reproduce the information signal on or from the main track.

The above main light beam is a zero-order (0-order) diffracted light which is generated by a diffraction grating, whereas the two sub light beams are first (+1st and −1st) diffracted lights which are also generated by the diffraction grating. The optical recording and reproducing apparatus which uses these three light beams records or reproduces the information signal on or from the main track by the main light beam (the 0-order diffracted light). In addition, by use of the main light beam reflected by the disc, a focusing error signal can be detected based on an astigmatic focusing method in which a subtraction is performed between a sum of outputs of a first pair of diagonally arranged optical sensors and a sum of outputs of a second pair of diagonally arranged optical sensors so as to obtain the focussing error signal. Moreover, it is possible to carry out the tracking control of a three spot type optical head by use of the two sub light beams (±1st diffracted lights).

However, the conventional optical recording and reproducing apparatus has the following disadvantages. The light intensity ratio of each of the ±1st diffracted lights to the 0-order light is generally 1:2 or 1:3. Therefore at the time of the recording, there is a possibility that the ±1st diffracted lights may damage the recording surface of the optical disc. Further, it becomes difficult to provide the 0-order light with enough power to record the information signal on the optical disc because there is a limit in the maximum output power of the laser diode. Moreover, when the light intensity of each of the ±−1st diffracted lights is reduced with respect to the 0-order diffracted light to prevent damage to the recording surface, no problem arises at the time of the recording. However, at the time of the reproduction, when the total light intensity of the light beam emitted by the laser diode is made considerably smaller than that at the time of the recording, the signal to noise ratio of an information signal read out by each of ±1st diffracted lights is degraded.

SUMMARY OF THE INVENTION

Accordingly, a general object of the present invention is to provide a novel and effective optical recording and reproducing apparatus, in which the above-described problems have been eliminated.

A more specific object of the present invention is to provide an optical recording and reproducing apparatus, in which the light intensity ratio of each of ±1st diffracted lights to the 0-order diffracted light is optimized.

Another object of the present invention is to provide an optical recording and reproducing apparatus, in which a recording surface of an optical disc is prevented from be damaged by ±1st diffracted lights at the time of the recording.

Still another object of the present invention is to provide an optical recording and reproducing apparatus, in which an information signal can be read out, with a high signal to noise ratio, from an optical disc by each of ±1st diffracted lights.

To attain the above objects and features, according to the present invention, there is provided an optical recording and reproducing apparatus comprising an optical disc having a recording surface; a laser diode emitting a laser beam; an optical lens for changing the laser beam into a parallel laser beam; a diffraction grating for difffracting the parallel laser beam and generating 0-order and ±1st diffracted lights, a light intensity ratio of each of the ±1st diffracted lights to the 0-order diffracted light ranging from 1:8 to 1:9; and an optical system for forming spot lights of the 0-order and ±1st diffracted lights on the recording surface of the disc and extracting the 0-order and +1st diffracted lights which have been reflected from the recording surface.

Other objects and further features of the present invention will become apparent from the following detailed description in conjunction with the attached drawings.

BRIEF DESCRIPTION OF THE DRAWINGS

FIG. 1 is a side view showing an example of an optical recording and reproducing apparatus according to the present invention;

FIG. 2 is an enlarged perspective view of a diffraction grating shown in FIG. 1, for explaining its function;

FIG. 3 is a cross sectional view of a part of the diffraction grating illustrated in FIG. 2;

FIG. 4 is a view showing an example of a track pattern formed on an optical disc used in the present invention;

DETAILED DESCRIPTION

Figure 5:
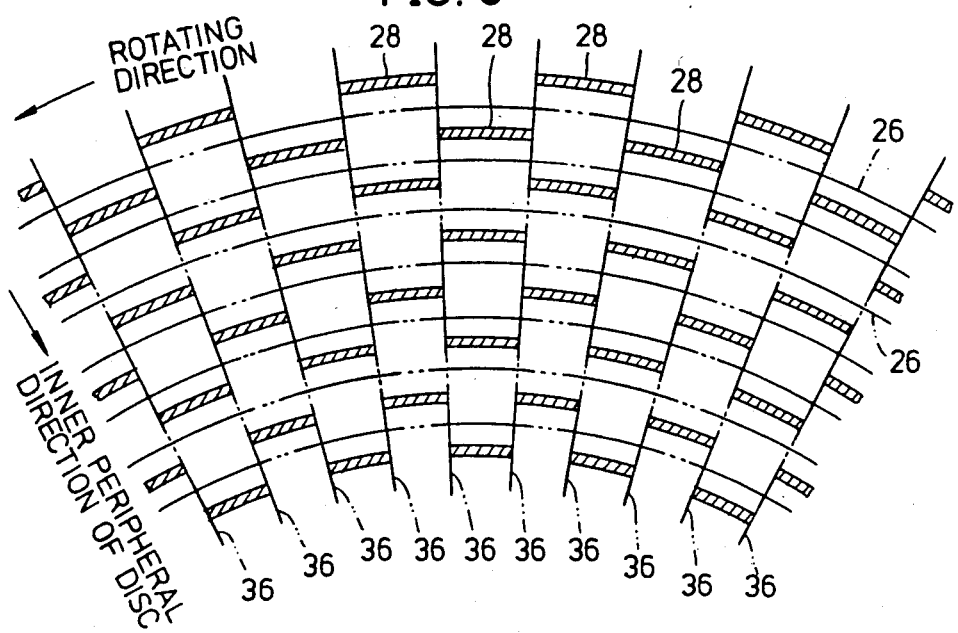
FIG. 5 is a plan view of an enlarged scale showing an essential part of the optical disc shown in FIG. 4.

A description will first be given of an example of an optical recording and reproducing apparatus according to the present invention by referring to FIG. 1.

In this figure, a light beam emitted by a laser diode 10 is changed to a parallel light beam by an optical lens 12. The parallel light beam from the lens 12 is diffracted by a diffraction grating 14, so that three light beams are generated.

FIG. 2 illustrates these three diffracted lights. The parallel light beam from the lens 12 (not shown in FIG. 2) forms an optical path 16 and enters the diffraction grating 14, which generates a 0-order diffracted light forming an optical path $16_0$ as well as 1st and $-$1st diffracted lights forming optical paths $16_{+1}$ and $16_{-1}$, respectively. The light intensity (or emitting time) of the laser beam forming the optical path 16 is modulated at the time of the recording in accordance with an information signal to be recorded. In addition, the intensity during the emission period is set to a value which is sufficient for the recording of the information signal on a recording surface of an optical disc 24 (FIG. 1) by use of the 0-order diffracted light. On the other hand, at the time of the reproduction, the intensity of the light beam emitted by the laser diode 10 is reduced in the range from one tenth to one nineteenth of the light intensity at the time of the recording, so that damage to the recording surface of the disc 24 can be prevented. In addition, the intensity is always kept constant.

The diffraction grating 14, which is one of the essential features provided by the present invention, has grooves of the depth d, as illustrated in FIG. 3. The light intensity ratio of each of the ±1st diffracted lights to the 0-order diffracted light can be selected to a predetermined value by adjusting the depth d. This is described in detail later.

Returning to FIG. 1, the light beams from the diffraction grating 14 pass through a beam splitter or half mirror 18 and are then reflected by a mirror 20. The light beams from the mirror 20 pass through an optical lens 22 and are irradiated on the recording surface of the optical disc 24. In detail, the 0-order diffracted light is irradiated on the recording surface as a main light beam for the information signal recording and reproducing, whereas the ±1st diffracted lights are irradiated thereon as sub light beams for the tracking control.

The optical disc 24 may be selected from among a plurality of types of optical discs. For example, it is possible to use an optical the disc disclosed in the U.S. patent application Ser. No. 837,407 entitled "ROTARY RECORDING MEDIUM HAVING A GUIDE TRACK AND RECORDING AND REPRODUCING APPARATUS THEREFOR", the assignee of which is the same as the assignee of the present application.

Figure 6:
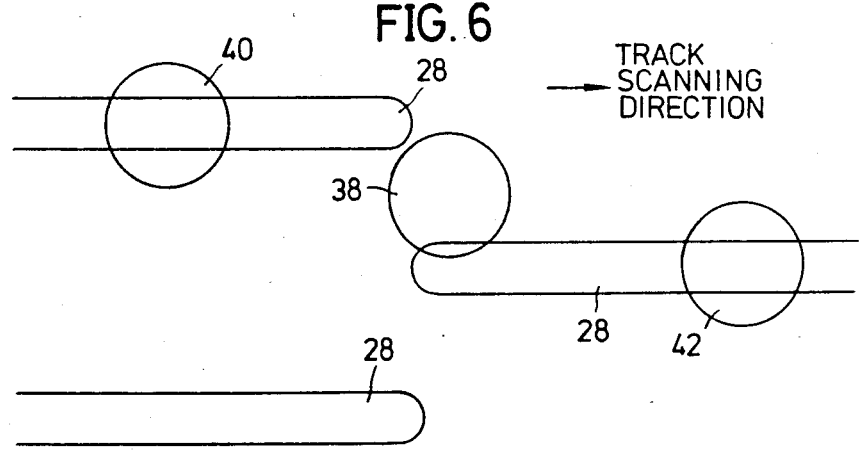
FIG. 6 is a plan view of an enlarged scale showing the positional relationship of three light beam spots which are formed on the recording surface of the optical disc.

FIGS. 4 through 6 illustrate an optical disc disclosed in the above U.S. application. Referring to FIG. 4, the optical disc 24 has a diameter of 30 cm, for example, and a spiral guide track T is formed with a constant track pitch (for example, 1.6 microns) when the disc 24 is produced. The guide track T is made up of a plurality of consecutive guide track turns, and each guide track turn is constituted by an intermittent row of pits. In other words, a pre-formed pit 28 and a non-pit portion 30 are alternately formed repeatedly in each guide track turn. The pre-formed pits 28 are initially formed on the disc 24 before an information signal is first recorded thereon. That is, the pre-formed pits 28 are pre-formed on the disc 24 before the actual recording of the information signal. In the present specification, these pre-formed pits 28 will simply be referred to as pits 28. Also, although the guide track T is formed in the spiral, the guide tracks per one track turn will be referred to as one guide track.

The length of each pit 28 of the guide track T is selected to a value which is equal to a recording length of one horizontal scanning period (1H) of a video signal recorded on a constant angular velocity (CAV) system disc, and the depth of the groove of each pit is equal to one fourth the wave length of the light beam, for example. In addition, as clearly shown in FIG. 5, when the recording surface of the disc 24 is divided into a plurality of imaginary equiangular sectoral regions, the pit 28 is formed in only one of two consecutive guide track turns of the guide track T in each equiangular sectoral region so that the pits 28 are formed in every alternate guide track turn in a radial direction of the disc 24 in each equiangular sectoral region. In detail, the pits 28 will naturally be formed in this manner when the recording surface of the disc 24 is divided into an odd number of equiangular sectoral regions and the pits 28 are formed in every alternate equiangular sectoral region in each guide track turn. For example, when the recording surface of the disc 24 is divided into 525 equiangular sectoral regions, one of two consecutive guide track turns comprises 262 pits 28, while the other turn comprises 263 pits 28.

A center hole 32 is formed at a center of the disc 24, and a label portion 34 is formed on the periphery of the center hole 32. As will be described later on in the present specification, an information signal including the video signal is recorded on and reproduced from an information signal recording track formed in a region between two consecutive guide track turns of the guide track T, by use of the 0-order diffracted light (main light beam). In FIG. 4, a center line of the information signal recording track is indicated by a two-dot chain line 26.

As clearly shown in FIG. 5, the pit 28 is arranged so that the start and end of each pit 28 indicated by hatchings in one equiangular sectoral region coincide with the end of the pit 28 in one adjacent equiangular sectoral region and the start of the pit 28 in another adjacent equiangular sectoral region, respectively. Boundary lines 36 indicated by one-dot chain lines connect the starts and ends of the pits 28 in the radial direction of the disc 24, and these boundary lines 36 define the equiangular sectoral regions.

As described above, the guide track is formed with the intermittent row of pits and the pits are formed in every alternate guide track turn in the radial direction of the disc 24 i each equiangular sectoral region. Therefore, it is possible to obtain a tracking error signal from a guide track reproducing signal relative to the main light beam and to thereby perform the accurate tracking control, compared with use of the disc having the guide tracks formed with the consecutive grooves which are arranged on both the sides of the information signal recording track. Further, since the depth of the groove of the guide track is equal to $\lambda/4$ ($\lambda$ is a wave length of the laser beam), the light beam reflected by the disc is not diffracted. For this reason, even when the light beam transverses the guide track at the time of the reproduction, the correct reproducing operation can be assured. As a result, since it becomes possible to employ the astigmatic focusing method for the focusing error detection, the optical system of the optical recording and reproducing apparatus can be reduced in size, as compared with the conventional recording and reproducing apparatus in which the information signal is recorded in one guide track turn.

As shown in FIG. 6, the 0-order diffracted light (main light beam) which is propagated through the optical path $16_0$ illustrated in FIG. 2 forms an optical spot 38 on the recording surface of the aforementioned disc 24, whereas the +1st diffracted light and the −1st diffracted light (sub light beams) which are respectively propagated through the optical paths $16_{+1}$ and $16_{-1}$ form optical spots 40 and 42. Each of the spots 40 and 42 scans the respective guide track turns which are adjacent to each other. The spot 38 of the 0-order diffracted light scans the center portion of the track which is positioned between the adjacent guide tracks.

The 0-order and ±1st diffracted lights are reflected from the recording surface of the disc 24 and enter an optical lens 44 via the lens 22, the mirror 20 and the beam splitter 18, as shown in FIG. 1. Then, three separated light beams are projected onto photo detectors 46, 48 and 50 which correspond to the beam spots 38, 40 and 42, respectively.

The light intensity ratio of each of the ±1st diffracted lights to the 0-order diffracted light is selected as follows. A laser diode with the maximum output power equal to approximately 30 mW (absolute maximum rating) suitable for the optical recording and reproducing apparatus is currently available in the market. When using the above laser diode to form the optical system, the light intensity (luminous energy) of the laser beam which has reached the disc is a maximum of 15 mW, since the luminous energy loss thereof resulting from the optical system is estimated at approximately 50%. When actually using the laser diode, a slight room for the output of the laser diode must be provided, since the maximum output of 30 mW is the absolute maximum rating. In this regard, the actual light intensity available on the recording surface of the disc is estimated at 14 mW or less.

On the other hand, the maximum light intensity at which the recording surface of the disc can be ensured against damage caused by the ±1st diffracted lights is approximately 1.5 mW on the disc. Further, the minimum light intensity at which the detection of the electrical signal corresponding to the ±1st diffracted lights can be ensured with a high signal to noise ratio at the time of the reproduction, is 0.09 mW on the disc. Consequently, it is required that the light intensity of the ±1st diffracted lights on the disc ranges from 0.09 mW to 1.5 mW.

Therefore, according to the present invention, the following light intensity ratio is selected:

(intensity of each of ±1st diffracted lights):

(intensity of 0-order diffracted light)=1:8∼1:9.

As described previously, at the time of the recording, the total light intensity (total luminous energy) of the light which has reached the disc is equal to 14 mW when using the laser diode of the maximum output of 30 mW. In this state, the light intensity of the 0-order diffracted light is equal to 11.2 mW and the light intensity of each of +1st diffracted lights is equal to 1.4 mW in the ratio 1:8. In the ratio 1:9, the intensity of the 0-order diffracted light is approximately 11.4 mW and the intensity of each of the +1st diffracted lights is approximately 1.3 mW. It will therefore be understood that these values satisfy the above-described condition.

At the time of the reproduction, supposing that the total light intensity (total luminous energy) of the light which has reached the disc is equal to 1 mW, the intensity of the 0-order diffracted light is 0.8 mW and the intensity of each of the ±1st diffracted lights is 0.1 mW in the ratio 1:8. In the ratio 1:9, the intensity of the 0-order diffracted light is approximately 0.8 mW and the intensity of each of the ±1st diffracted lights is approximately 0.09 mW. It will be therefore understood that these values satisfy the above condition.

The ratio of the light intensity corresponds to the depth d of the grooves of the diffraction grating 14. Assuming that the wave length of the laser beam emitted by the laser diode 10 is $\lambda$, the refractive index of the diffraction grating 14 is n, the depth of the grooves formed in the diffraction grating 14 is d, the light intensity of the 0-order diffracted light is I(0), and the light intensity of each of the ±1st diffracted lights is I(1), it is known that the following equation is derived:

$$I(1)/I(0)=4\times(1-\cos\phi)/\pi^2(1+\cos\phi)$$

where $\phi=[2\pi d(n-1)]/\lambda$(rad). As apparent from the above equation, it is possible to select the light intensity ratio I(1)/I(0) of each of the ±1st diffracted lights to the 0-order diffracted light by varying the depth d of the grooves formed in the diffraction grating 14.

Currently, a plurality of tracking control procedures by using the 0-order and ±1st diffracted lights have been proposed, and the present invention is of course applicable thereto. For example, there has been proposed a configuration for tracking control which produces a switching pulse signal on the basis of reproduced signals which are obtained by scanning the guide track by the ±1st diffracted lights, and produces a tracking error signal by switching signals reproduced from two mutually adjacent track turns of the guide track by the 0-order diffracted light responsive to the switching pulse signal, and controls a scanning position of the 0-order diffracted light responsive to the tracking error signal so that the 0-order diffracted light scans a center position between the two mutually adjacent track turns of the guide track to record or reproduce an information signal. This procedure for the tracking control is further disclosed in the U.S. patent application Ser. No. 873,407 (the assignee of which is the same as the present application). Further, there is another configuration for the tracking control, in which an address signal recording portion is arranged in each track turn of the guide track and is pre-recorded with an address signal, and a pseudo address signal recording portion is arranged in each track turn of the guide track adjacent to a corresponding address signal recording portion provided in a track turn of the guide track adjacent thereto, so that it becomes possible to carry out a stable tracking control on the basis of the signals reproduced from the two mutually adjacent track turns of the guide track. This configuration is further disclosed in the U.S. patent application Ser. No. 929,605 (the assignee of which is the same as the assignee of the present application).

The present invention is not limited to the embodiments, but various variations and modifications may be made without departing fom the scope of the present invention. For example, the configuration of the diffraction grating is not limited to one illustrated in FIG. 3, but many types of configurations may be employed. Moreover, it is possible to use an optical disc having a plurality of concentric guide tracks formed thereon.

What is claimed is:

1. An optical recording and reproducing apparatus comprising:
    an optical disc having a recording surface;
    a laser diode emitting a laser beam;
    an optical lens for changing the laser beam into a parallel laser beam;
    a diffraction grating for diffracting the parallel laser beam and generating 0-order and ±1st diffracted lights, a light intensity ratio of each of the ±1st diffracted lights to the 0-order diffracted light ranging from 8:1 to 9:1; and
    an optical system for forming spot lights of the 0-order and ±1st diffracted lights on the recording surface of said disc and extracting the 0-order and ±1st diffracted lights which have been reflected from the recording surface.

2. An optical recording and reproducing apparatus as claimed in claim 1, wherein the light intensity ratio of each of the ±1st diffracted lights to the 0-order diffracted light is constant at the time of the recording and the reproduction.

3. An optical recording and reproducing apparatus as claimed in claim 1, wherein the light intensity ratio of each of the ±1st diffracted lights to the 0-order diffracted light is selected by the depth of grooves of said diffraction grating.

4. An optical recording and reproducing apparatus as claimed in claim 3, wherein when the wave length of the laser beam emitted by said laser diode is $\lambda$, the refractive index of said diffraction grating is n, the depth of the grooves of said diffraction grating 14 is d, the light intensity of the 0-order diffracted light is I(0), and the light intensity of each of the ±1st diffracted lights is I(1), the light intensity ratio I(1)/I(0) is determined in accordance with the following equations:

$$I(1)/I(0) = 4 \times (1 - \cos \phi)/\pi^2 (1 + \cos \phi)$$

where $$\phi = [2\pi d(n-1)]/\lambda \text{(rad)}.$$

* * * * *